(12) United States Patent
Kano et al.

(10) Patent No.: US 7,536,491 B2
(45) Date of Patent: *May 19, 2009

(54) SYSTEM, METHOD AND APPARATUS FOR MULTIPLE-PROTOCOL-ACCESSIBLE OSD STORAGE SUBSYSTEM

(75) Inventors: Yoshiki Kano, Sunnyvale, CA (US); Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/073,824

(22) Filed: Mar. 11, 2008

(65) Prior Publication Data
US 2008/0209090 A1    Aug. 28, 2008

Related U.S. Application Data

(63) Continuation of application No. 11/284,808, filed on Nov. 23, 2005, now Pat. No. 7,366,808.

(51) Int. Cl.
G06F 13/42 (2006.01)
G06F 3/00 (2006.01)
G06F 13/12 (2006.01)
G06F 13/36 (2006.01)

(52) U.S. Cl. .................. 710/105; 710/14; 710/74
(58) Field of Classification Search .............. 710/11, 710/14, 33, 72, 74, 105–106, 315, 316
See application file for complete search history.

(56) References Cited

U.S. PATENT DOCUMENTS 6,499,056 B1   12/2002   Kitamura et al.
6,801,970 B2   10/2004   Riley et al.
6,883,049 B1    4/2005   Fuld et al.
2003/0084219 A1  5/2003   Yao et al.
2004/0103206 A1  5/2004   Hsu et al.
2006/0026280 A1  2/2006   Sadovsky et al.

FOREIGN PATENT DOCUMENTS

JP     2004227154 A     8/2004

OTHER PUBLICATIONS

"Information Technology—Fibre Channel Protocol For SCSI, Third Version", Draft Proposed, Amer. National Standard, T10, Project 1560-D, Revision 3g, Jul. 11, 2005, pp. i-127.

"Information technology—SCSI Object-Based Storage Device Commands-2 (OSD-2)", Working Draft, Project T10/1731-D, Revision 0, Oct. 4, 2004, pp. i-176.

"Object Storage Architecture", White Paper, Panasas, Inc., Freemont, CA, pp. 1-24.

*Primary Examiner*—Thomas J Cleary
(74) *Attorney, Agent, or Firm*—Mattingly & Malur, P.C.

(57) ABSTRACT

An apparatus, system, and method enable access to a storage system by distinguishing SCSI Object-Based Storage Device Commands (OSD) commands from block-based SCSI commands on the same port and storage subsystem. The storage subsystem has the capability of identifying the storage protocol from a corresponding command, and processes the command accordingly for a storage device formatted for use with the respective storage protocol. This way, a storage subsystem can consolidate data from several dedicated command ports to a single physical port, while also enabling a single storage system to store and provide access to data in multiple different storage protocol formats.

19 Claims, 16 Drawing Sheets

| | 131 | 132 | 133 | 134 | 135 |
|---|---|---|---|---|---|
| | LU | PARTITION ID | USER OBJECT ID | Length | Allocated Segment |
| | 0 | 10000h | 10000h | 24576 | 1,2,3 |
| | | 10000h | 10001h | 8192 | 10 |
| | | 10000h | 10002h | 24576 | 12,13,14 |
| | | ... | ... | | |
| | | ... | ... | | |
| | ... | ... | ... | | |

| 121 | 122 |
|---|---|
| LU | Un-allocated Segment |
| 0 | 20,21,22,23,... |
| ... | ... |

| Parity Group | Size | RAID | Disk # | LDEV | Start LBA | End LBA |
|---|---|---|---|---|---|---|
| 1 | 100TB | RAID5 | 1,2,3,4 | 1 | 0 | 1073741823 |
|  |  |  |  | 2 | 1073741824 | 2147483647 |
|  |  |  |  | ... | ... | ... |
| 2 | 200TB | RAID1 | 10,11,12,13 | 10 | 0 | 2147483647 |
| 3 | 1TB | RAID1 | ... | ... | ... | ... |
| 4 | 2TB | ... | ... | ... | ... | ... |
| ... | ... | ... | ... | ... | ... | ... |

FIG. 7 (Related Art)

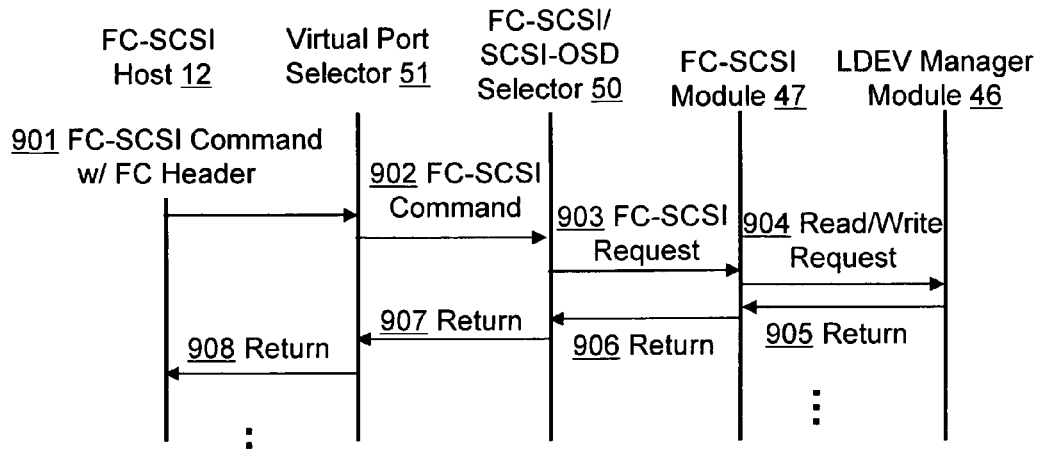
FIG. 11A FC-SCSI
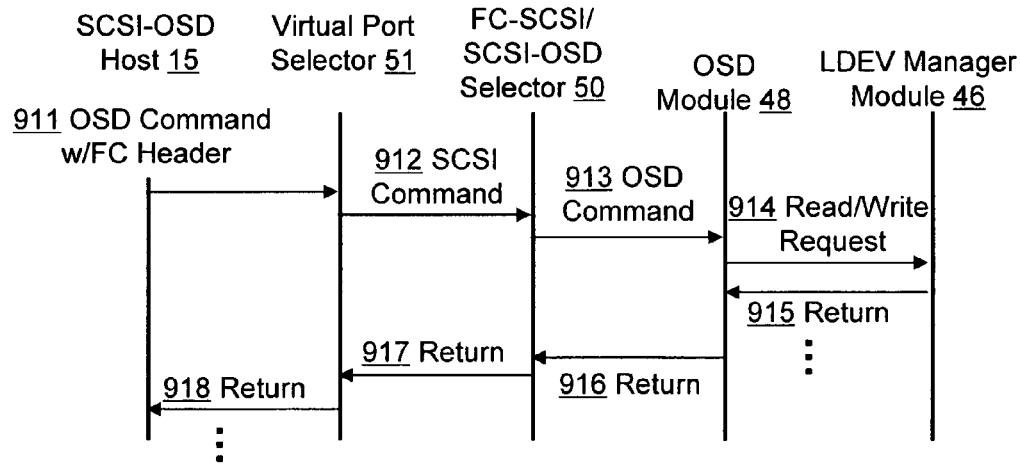
FIG. 11B SCSI-OSD
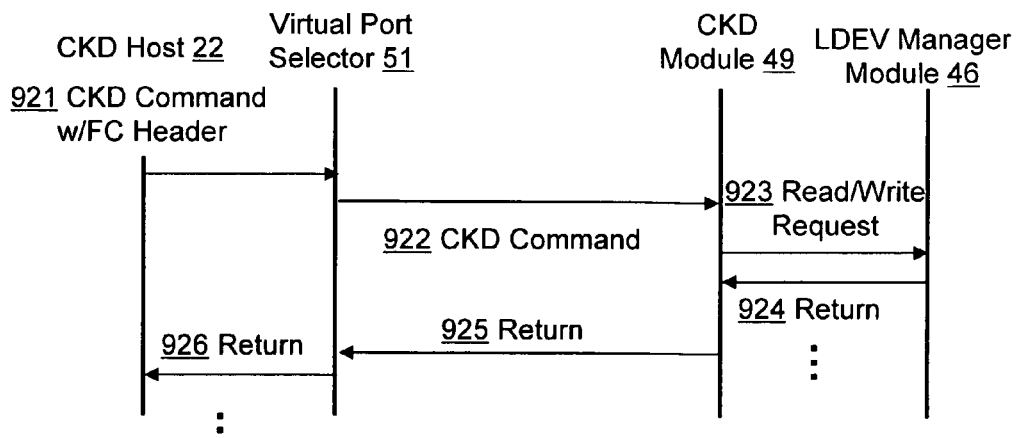
FIG. 11C CKD

| WORDS \ BITS | 31 | ... | 24 | 23 | ... | 16 | 15 | ... | 08 | 07 | ... | 00 |
|---|---|---|---|---|---|---|---|---|---|---|---|---|
| 0 | R_CTL | | | | | | D_ID | | | | | |
| 1 | CS_CTL/PRIORITY | | | | | | S_ID | | | | | |
| 2 | TYPE | | | | | | F_CTL | | | | | |
| 3 | SEQ_ID | | | DF_CTL | | | SEQ_CNT | | | | | |
| 4 | OX_ID | | | | | | RX_ID | | | | | |
| 5 | PARAMETER | | | | | | | | | | | |

FIG. 17 (Related Art)

SYSTEM, METHOD AND APPARATUS FOR MULTIPLE-PROTOCOL-ACCESSIBLE OSD STORAGE SUBSYSTEM

CROSS-REFERENCE TO RELATED APPLICATION

This is a continuation application of U.S. Ser. No. 11/284,808, filed Nov. 23, 2005, now U.S. Pat. No. 7,366,808 the entire disclosure of which is incorporated herein by reference.

BACKGROUND OF THE INVENTION

1. Field of the Invention

The invention relates generally to accessing storage subsystems, and, more particularly, to multiple-protocol-accessible object-based-storage-device storage systems.

2. Description of the Related Art

In recent years, Fibre Channel (FC) connectivity for storage systems and Fibre Channel-based storage area networks (FC-SANs) have become more common in the storage industry. Fibre Channel has been adopted as an American National Standards Institute (ANSI) standard, which was originally intended for high-speed SANs connecting servers, disk arrays, and backup devices. The first Fibre Channel protocol was approved by the ANSI standards committee in 1994, running at 100 Mb/s. Under more recent innovations, the speeds of FC-SANs have increased to 10 Gb/s, and higher. Many network architectures are possible with Fibre Channel, with one popular arrangement including a number of devices attached to one or two (for redundancy) central Fibre Channel switches, creating a reliable infrastructure that allows hosts and servers to share disk storage arrays, tape libraries, or the like.

Current storage subsystems such as Hitachi's TagmaStore™ Universal Storage Platform include connection capabilities for ANSI FCP-3 (Fibre Channel Protocol 3). (See, e.g., The International Committee for Information Technology Standards (INCITS) "T10, Project 1560-D, Revision 3g", t10.org/ftp/t10/drafts/fcp3/fcp3r03g.pdf, hereinafter, "ANSI FCP-3".) The TagmaStore™ Universal Storage Platform is able to store and protect data using RAID technology, and provides for storage of data via various other protocols as well, such as CIFS, NFS, FC-SCSI, and FICON® (a proprietary Fibre Connectivity protocol developed by IBM Corporation for use with mainframe computers). These various data access protocols require different accommodations to function with a storage system. For example, the FC-SCSI protocol uses an FBA (fixed block architecture) format for storage, while the FICON® protocol uses a CKD (count key data) format, which is commonly used for communication between storage systems and mainframes. U.S. Pat. No. 6,499,056, to Kitamura et al., the disclosure of which is incorporated herein by reference, discloses a storage system that includes both an FBA interface and a CKD interface.

In the FBA format used in the FC-SCSI protocol, the data is stored in a specified region known as a "block". Each of the blocks typically has a fixed length, such as 512 bytes. A logical block address (LBA) is assigned to each block, and the LBA is used when accessing the data in a block. Contrarily, in the CKD format, such as is used in the FICON® protocol, a cylinder number (CC), a head number (HH) and a record number (R) are assigned to an associated record to enable access. Thus, the minimum amount of data that may be accessed using the CKD format is an entire record.

Further, multiple external storage systems connected to a TagmaStore™ Universal Storage Platform are presented to a user as if the multiple storage systems were merely additional internal storage in a common storage pool, managed by the Universal Storage Platform's software tools. This external storage can be grouped into classes based on attributes of performance, availability, recoverability, and cost, but is functionally equivalent to internal storage as far as software for data migration and replication or host-based software is concerned.

Also, in recent years, SCSI Object-Based Storage Device Commands have become standardized by ANSI and INCITS. The SCSI (Small Computer Systems Interface) command set for use with Object-Based Storage Devices (OSDs) provides for efficient operation of input/output logical units that manage the allocation, placement, and accessing of variable-sized data-storage "objects". Current OSD architecture treats storage as neither traditional blocks nor files, but as objects that are comprised of data and attributes of the data. For example, an object might be a part of a file, many files, or parts of many files, along with attribute information regarding the data that makes up the object. The OSD is typically aware of the content of the object, and is able to handle the lower-level details of device management, such as block allocation. (See, e.g., American National Standard Institute standard "ANSI INCITS 400-2004" (ansi.org) and "SCSI Object-Based Storage Device Commands-2 (OSD-2)" (t10.org/ftp/t10/drafts/osd2/osd2r00.pdf, hereinafter "OSD-2".) According to the OSD specifications, OSDs provide an access method for data specifying USER_OBJECT_ID based on the SCSI specification, which may be referred to as the SCSI-OSD format. In the following, "OSD" refers to SCSI-OSD.

In general, to access several storage or data access protocols on a SCSI-OSD-capable storage subsystem (i.e., which provides one or more object-based volumes), it is necessary to provide a separate storage subsystem for each data access protocol. For example, when a host requires access to a SCSI-OSD volume, the storage subsystem prepares a SCSI-OSD storage subsystem for the host. When a host requires access to an FC-SCSI-based volume which provides logical block addresses through Fibre Channel on a SCSI-OSD storage subsystem, there is no capability for the storage subsystem to provide an FC-SCSI-based (LBA) volume, and it becomes necessary to prepare a new storage subsystem to store FC-SCSI formatted data. This is time consuming and inefficient. Further, conventional storage systems and networks provide no method to share SCSI-OSD protocol and FC-SCSI protocol in a single port.

SUMMARY OF THE INVENTION

An object of the invention is to provide a method and apparatus in which a port is provided with capabilities for enabling use of the FC-SCSI protocol, or other data access protocols, on a SCSI-OSD enabled storage subsystem.

Another object of the present invention is to provide a method and apparatus for executing FC-SCSI and SCSI-OSD commands on each executable logical unit (LU).

One example of a procedure for achieving the above-mentioned objects includes that an FC-SCSI/SCSI-OSD selector is provided that receives a CDB (Command Descriptor Block) issued from a host to a target peripheral containing the operation to be performed and the parameters associated with that operation). The selector checks whether or not the OPERATION CODE in the CDB is a code that specifies SCSI-OSD and whether or not SCSI-OSDs SERVICE ACTION code is used between prescribed ranges. If so, the selector determines that the format is SCSI-OSD, selects a logical unit (LU) from a list of LUs for SCSI-OSD storage, and the selector executes the CDB as a SCSI-OSD operator. If the selector determines that the CDB is not in SCSI-OSD format, the selector selects an LU from a list of LUs for FC-SCSI, and the selector executes the CDB as an FC-SCSI operator.

Various other objects, features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 5 illustrates a typical table of a relation between PARTITION_ID, USER_OBJECT_ID, length and allocated segment.

FIG. 6 illustrates a segment pool of LUs and un-allocated segments.

FIG. 7 illustrates a table showing a relationship between parity groups, disks and LDEVs.

FIGS. 11A-11C illustrate access procedures for each host type in FIG. 10, respectively.

FIG. 17 illustrates a typical format of an FC-2 header.

DETAILED DESCRIPTION OF THE INVENTION

Figure 1:
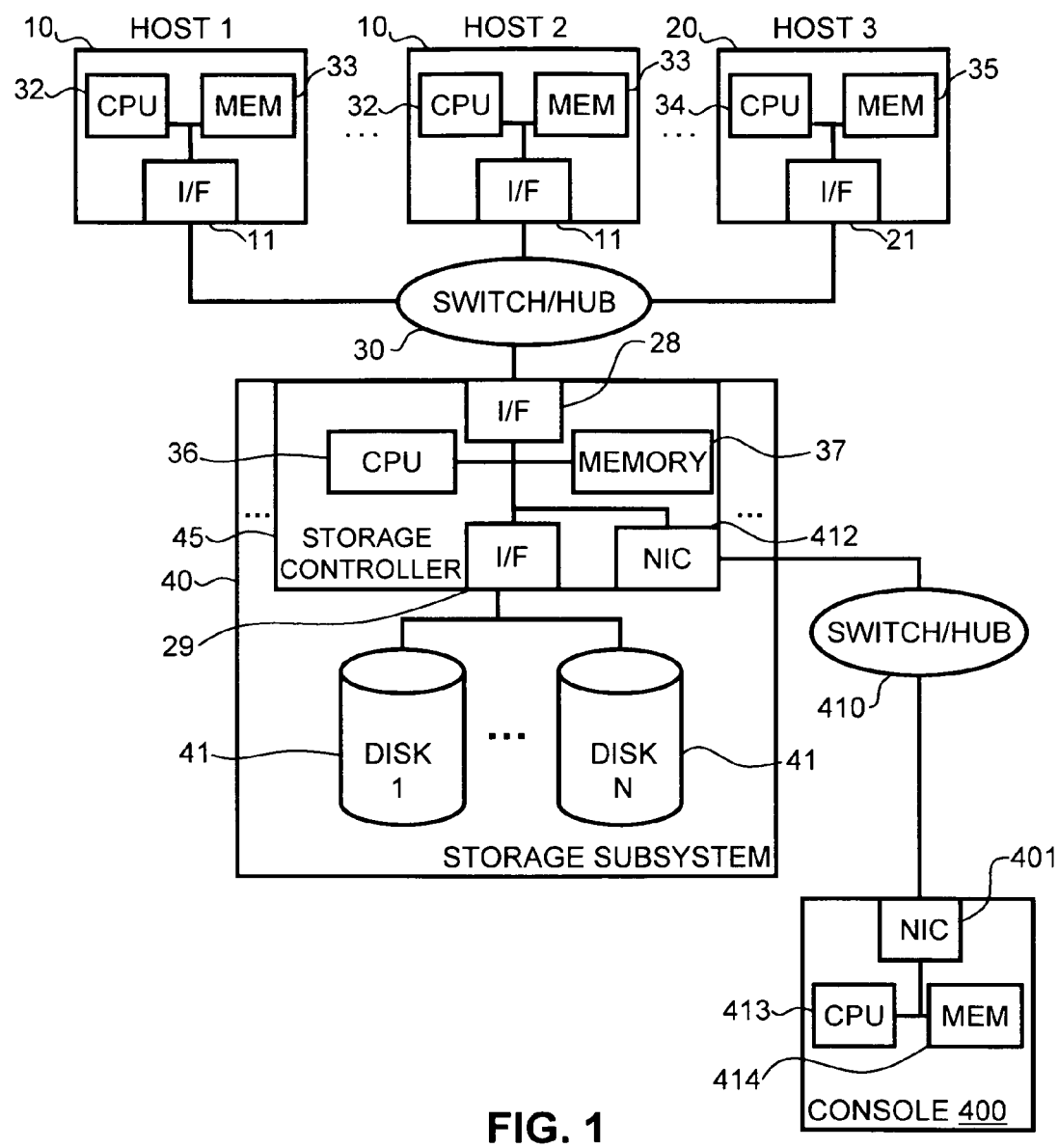
FIG. 1 shows an example of a physical configuration of a system according to a first embodiment.

In the following detailed description of the invention, reference is made to the accompanying drawings which form a part of the disclosure, and, in which are shown by way of illustration, and not of limitation, specific embodiments by which the invention may be practiced. In the drawings, like reference numerals describe substantially similar components throughout the several views.

The following describes embodiments of the present invention for realization of providing an FC-SCSI I/F, which is an I/F to access a Logical Block Address (LBA) volume, and other protocol I/Fs, on a SCSI-OSD storage subsystem which includes an I/F to access object-based accessible volumes. The first embodiment is directed toward selecting a SCSI-OSD or FC-SCSI frame by the CDB. This has the benefit that the storage subsystem can provide a port which has the capability to process SCSI-OSD and FC-SCSI operations for each dedicated Logical Unit (LU), as well as CKD operations. The second embodiment has the same benefit, but is directed to selecting SCSI-OSD or FC-SCSI by an FC-Frame.

First Embodiment

Physical Configuration

FIG. 1 shows an example of a physical configuration of the system according to a first embodiment of the invention. The system includes one or more PC-based hosts 10 (hosts 1 and 2 in FIG. 1), one or more mainframe hosts 20 (host 3 in FIG. 1), a storage subsystem 40 in communication with the hosts, and a management console 400 for managing the storage subsystem 40. Each host 10 may be a general server such as a Windows®-based PC server or a Unix® server. The hosts 10 include a CPU 32, a memory 33, and a Fibre Channel-based network interface (I/F) 11, such as a host bus adapter (HBA). The host 10 may also have a NIC (Network Interface Card) (not shown) to communicate with other hosts via a LAN (not shown), and may include a local storage (also not shown) used for storing operating system (OS) data, user data, or the like.

The host 20 may be a general mainframe host such as an IBM Z-Series mainframe. The host 20 includes a CPU 34, a memory 35, and a network I/F 21, such as a FICON®-based HBA. The host 20 may also have a NIC (not shown) to communicate with other hosts, and may include a local storage (also not shown) to store OS data, user data, or the like.

Storage subsystem 40 is preferably a RAID technology based storage subsystem. Storage subsystem 40 includes physical disks 41 and a controller 45. The controller 45 includes a CPU 36, a memory 37, a network interface (I/F) 28 to connect to switch/hub 30 and a disk I/F 29 to connect to one or more physical disks 41. As is known in the art, the memory 37 may include a cache memory for caching data read from, or to be written to, disks 41, and may further include a redundant nonvolatile RAM portion with a battery backup and a cache mirror with a double redundancy controller to avoid data loss in case of a power outage, cache failure, or the like. Accordingly, multiple controllers 45 may be included in storage subsystem 40.

The switch/hub 30 provides a capability to connect from hosts 10, to storage subsystem 40. The switch/hub 30 can be physically embodied as a Fibre Channel switch in case of FC-SCSI protocol or FICON® protocol. In case of iSCSI (Internet SCSI), the switch/hub 30 can be physically embodied as an Ethernet® switch. The system also may be realized by other types of connections, including infiniBand®, Token Ring®, FDDI, wireless LAN (i.e., WiFi®, such as that defined in IEEE 802.11 A/B/G), etc.

Storage system management console 400 may also be provided for managing storage subsystem 40, and may be a general server such as a Windows®-based PC server or Unix® server. Console 400 preferably has a NIC 401 using Ethernet® protocol running TCP/IP protocol to ensure effective data communication. A second switch/hub 410 provides a capability to connect the console 400 to storage subsystem 40 via a NIC 412. The switch/hub 410 is preferably embodied physically as an Ethernet® switch. However, other types of connections may be employed, including infiniBand®, Token Ring®, FDDI, wireless LAN, etc. Console 400 also includes a CPU 413 and a memory 414, and may include a local storage (not shown) for storing an operating system, user information, and the like. The console 400 is connected to controller 45 via a LAN 411 and has GUI capability to manage storage subsystem 40.

Logical Configuration

Figure 2:
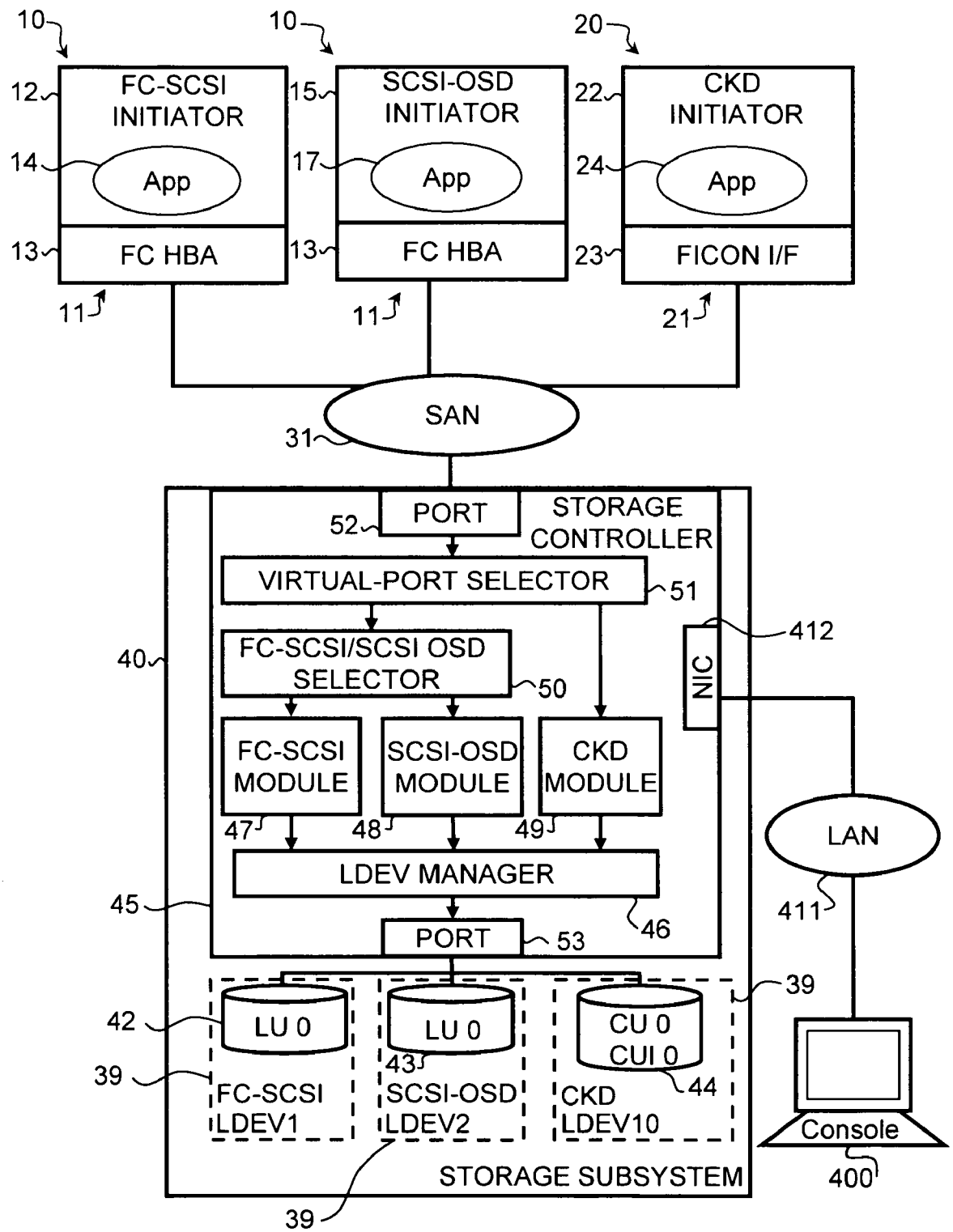
FIG. 2 shows an example of a logical configuration of the system according to the first embodiment.

FIG. 2 shows an example of a logical configuration of the system according to the first embodiment. The system includes an FC-SCSI initiator 12 that uses the hardware of a PC-based host 10, a SCSI-OSD initiator 15 that also uses the hardware of a PC-based host 10, and a Count Key Data (CKD) initiator 22 that uses the hardware of a mainframe-based host 20 in communication with the storage subsystem 40 via a storage area network (SAN) 31.

FC-SCSI initiator host 12 includes a Fibre Channel HBA 13 as I/F 11 and contains an application 14, which may be a database management system (DBMS), file system, etc. The FC-SCSI initiator host also runs an operating system (OS) (not shown) such as Windows®) or Unix® and device drivers (not shown) for the Fibre Channel HBA 13 and other peripherals. When the host uses Ethernet® to connect to SAN 31, the host may use an iSCSI HBA or standard NIC card with a software-based iSCSI device driver for I/F 11, rather than FC-HBA 13.

SCSI-OSD initiator host 15 preferably includes a Fibre Channel HBA 13 as I/F 11, and contains a SCSI-OSD-accessible application 17 such as a DBMS, file system, etc. As with FC-SCSI initiator host 12, SCSI-OSD initiator host 15 also runs an OS such as Windows® or Unix® (not shown) and device drivers for FC-HBA 13 and any other peripherals (not shown). When the host uses Ethernet® to connect to SAN 31, the host may use a SCSI-OSD-capable iSCSI-HBA or a standard NIC card with a software-based SCSI-OSD-capable iSCSI device driver as I/F 11 rather than the FC-HBA 13.

The CKD initiator host 22 uses the hardware of mainframe host 20, and includes a FICON® I/F 23 as I/F 21, which can provide an N_PORT (node port) on the channel side. CKD initiator host 22 also may include a CKD accessible application 24 such as a DBMS, etc. The host 22 also has an OS such as IBM Z-OS (not shown) and device drivers for controlling the FICON® I/F 23. When the host uses Ethernet® to connect to SAN 31, host 22 may use an Ethernet-based CKD-capable I/F as I/F 21.

SAN 31 is connected to hosts 12, 15, 22, as well as to storage subsystem 40 to permit communication therebetween. The SAN connection can be realized by either Fibre Channel switch 30 or an Ethernet® connection, depending upon the connection to storage subsystem 40.

Storage subsystem 40 includes controller 45 and logical volumes 42, 43, and 44. Generally one or more logical devices (LDEVs) 39 are created from the physical disks 41. The LDEVs may then be divided or concatenated to create logical volumes of a desired capacity. The logical volumes may also be referred to as logical units (LUs) when a logical unit number (LUN) has been assigned to them. Generally, an LUN is assigned to each logical volume, and each LDEV is mapped to a port for use with the FC protocol. WWNs (World Wide Names) are assigned to ports and other components of a SAN according to a format defined by the IEEE, (The Institute of Electrical and Electronics Engineers), a global organization responsible for setting and maintaining a large number of IT standards. Each company assigning WWNs must register with the IEEE to obtain a unique code for use with the WWNs of their products.

Port 52 on controller 45 is a logical port that is embodied by one or more physical I/Fs 28, and provides accessibility to several protocols for hosts 12, 15 and 22. To provide such accessibility, controller 45 includes microcode for several modules. The modules include port 52, virtual-port selector 51, FC-SCSI/SCSI-OSD selector 50, modules for processing each protocol, such as an FC-SCSI module 47, a SCSI-OSD module 48, and a CKD module 49. Other modules include a logical device (LDEV) manager 46 (which will be explained in more detail later), a parity group manager (not shown), and a port 53, embodied as physical I/F 29 for communication with the LDEVs. The modules are each described in more detail below.

Figure 3:
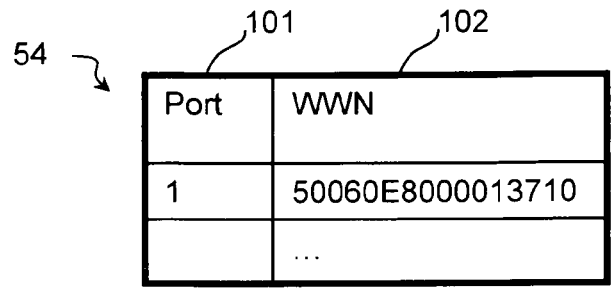
FIG. 3 shows an example of a conventional table for the configuration of a port.

Port 52 has at least a world wide name (WWN) for access from a host through SAN 31. FIG. 3 shows an example of a typical table 54 for associating port 52 with a WWN. The table 54 includes a port number 101 and a WWN 102 that is assigned to the port. The values of table 54 typically are provided from the hardware vender as fixed values. However, table 54 may be modified by an administrator via management console 400, as will be described later.

Virtual port selector 51 executes FC-PH (Fibre Channel Physical and signaling interface) protocol and selects the appropriate protocol on port 52 by differentiating between SCSI and CKD protocols for the CDB (Command Descriptor Block). The specifics of the procedure regarding the virtual port selector 51 will be discussed in more detail below.

Figure 4:
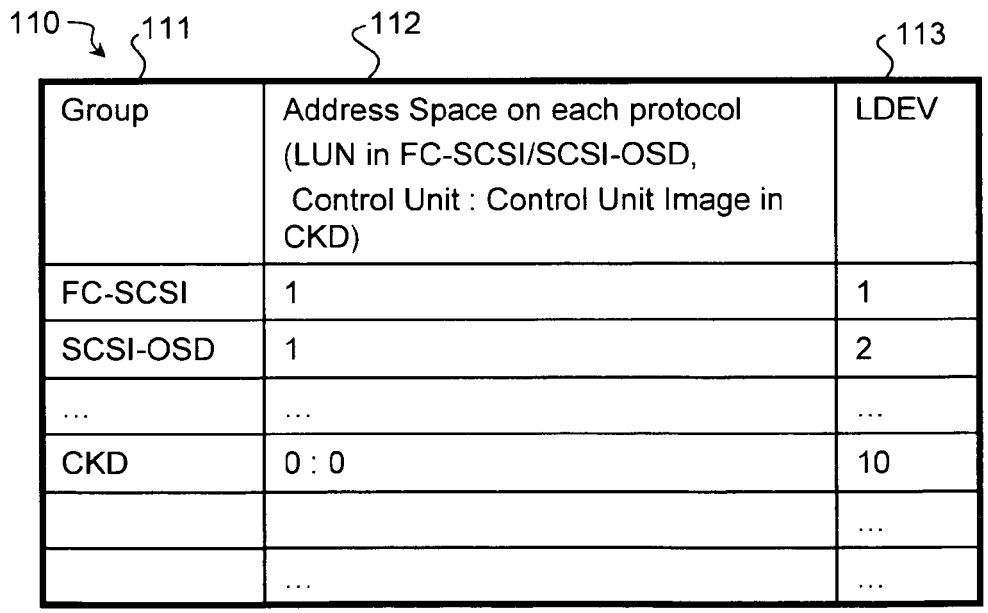
FIG. 4 illustrates the mapping of data access protocol groups and logical units according to one embodiment of the invention.

The FC-SCSI/SCSI-OSD Selector 50 distinguishes whether the CDB is for FC-SCSI format or based on SCSI-OSD operation code. According to the SCSI-OSD specification, the SCSI-OSD operation code is defined as 7Fh in byte 0 on a basic SCSI-OSD CDB and when a SCSI-OSD SERVICE ACTION code between 8800h and 8F7Fh is used. The detail of the procedure for FC-SCSI/SCSI-OSD selector 50 is discussed further below. In order to select LUs, selector 50 needs to be able to access a list of LUs available for each protocol group. The microcode has mappings of protocol group to LUs, as shown in table 110 in FIG. 4. The mapping specifies the protocol group 111 used to access each logical device (LDEV), address space 112 within each protocol, e.g., LUN in FC-SCSI/SCSI-OSD format or Control Unit:Control Unit Image (CU:CUI) in CKD format), and LDEV number 113 to specify the LDEV and store data thereto. The protocol group 111 assigns a protocol such as FC-SCSI, SCSI-OSD, CKD, etc., for each LDEV. The LUN for the LDEV is unique in each protocol group and is defined by an administrator via the console 400.

The FC-SCSI module 47 processes FC-SCSI command sets which are defined in a FC-SCSI primary command and SCSI Block Commands for LU based on ANSI standards for Fibre Channel for SCSI in case of a device that uses LBA format based on CDB (Common Descriptor Block). For example, the FC-SCSI module 47 processes READ and WRITE commands on the LU specified by a logical block address (LBA) and a transfer length. The FC-SCSI module 47 may also process other commands such as FORMAT, INQUIRY, etc.

SCSI-OSD module 48 processes SCSI-OSD command sets which are defined in the ANSI Object-Based Storage Device Commands (SCSI-OSD) specification. For example the SCSI-OSD module 48 processes CREATE, READ, and WRITE operations for user objects within a partition. The OSD processes the command for a LU. However, the operation for such a command is different from FC-SCSI command set because SCSI-OSD uses a PARTITION_ID and a USER_OBJECT_ID as an access identifier. Therefore, the SCSI-OSD module 48 requires a special LU for use as an OSD.

The SCSI-OSD's LU provides USER_OBJECT_ID and a mapping between USER_OBJECT_ID and storing segments. The partition contains a set of user objects to manage within a security group and is managed by PARTITION_ID in SCSI-OSD. A SCSI-OSD host must specify the PARTITION_ID to make a secure group for user objects.

The user object is a unit of data set to store data in a SCSI-OSD storage subsystem, and is managed by the USER_OBJECT_ID for that object. The USER_OBJECT_ID is created for each object by the user or the system by using the CREATE command operation. If CREATE command has 0 as USER_OBJECT_ID, the SCSI-OSD module returns the created ID within the partition. For example, SCSI-OSD module manages allocated or un-allocated USER_OBJECT_IDs for each LU. An un-allocated USER_OBJECT_ID within the partition defined by PARTITION_ID is created on creation of an LU for use with the SCSI-OSD format. The numbering for USER_OBJECT_IDs is started from 10000h. When the CREATE command is received, the SCSI-OSD module 48 returns the ID number and increases a pointer for the next allocatable USER_OBJECT_ID within the PARTITION_ID.

When a host accesses the created LU, the SCSI-OSD module 48 needs to manage a mapping between USER_OBJECT_ID within the PARTITION_ID and the storing segment. In FIG. 5, typical table 130 is illustrated for managing a relation between USER_OBJECT_IDs within PARTITION_IDs and allocated segment. The table 130 consists of LU number within SCSI-OSD protocol 131, PARTITION_ID 132, USER_OBJECT_ID 133 corresponding with USER_OBJECT_ID in the OSD specification, length for data in the object 134, and allocated segment from the segment pool 135. The segments are a collection of logical block address (LBA) blocks on the LDEV. The LBAs on the LDEV are divided by a certain size. As an example, this disclosure uses 8 KB (8192 Bytes) as the divided size. Each divided LBA is used as a segment. Each segment has number to identify the segment. The calculation of the LBA for each segment number is as follows:

$$LBA = \text{Segment Number} * 8192 \text{ Byte} / 512 \text{ Byte}$$

Upon the creation of the SCSI-OSD's LU, SCSI-OSD module 48 creates a segment pool. FIG. 6 illustrates a typical pool 120. The pool consists of LUs 121 within the SCSI-OSD protocol group which is determined from the protocol group 111 in table 110 of FIG. 4, and un-allocated segments 122. On initial creation of the SCSI-OSD LU, the SCSI-OSD module 48 inserts all of the created segments into un-allocated segment column 122.

Regarding host access to the SCSI-OSD LU 43 through the SCSI-OSD module 48, other major access commands are the READ and WRITE commands. When a WRITE command identifying PARTITION_ID and USER_OBJECT_ID is received from a host, SCSI-OSD module checks for the existence of matching PARTITION_ID and USER_OBJECT_ID in table 130 of FIG. 5. If there are no entries, the module returns an error. If there is a matching entry, the module checks the LENGTH in the WRITE CDB from Byte 36 to Byte 37, and allocates segments from segment pool 122 which can contain the size of the specified LENGTH and adds these to column 135 of table 130 of FIG. 5 for the appropriate logical unit on the SCSI-OSD group's LU. For example, if LENGTH indicates 15360 Bytes and segment size is 8 KB, the number of allocated segments is 2. SCSI-OSD module collects two segments, such as segments 20, 21 from the segment pool 122. The segment number order in allocated segment column 135 of table 130 is the address order for the PARTITION_ID and USER_OBJECT_ID. Then the SCSI-OSD module 48 writes data on the segments via the SCSI WRITE command, and returns success of the WRITE command by SCSI sense code if the SCSI-OSD WRITE operation is successful.

When a READ command identifying a PARTITION_ID and a USER_OBJECT_ID is received, the SCSI-OSD module 48 checks for the existence of the specified PARTITION_ID and USER_OBJECT_ID in the table 130 on FIG. 5. For example, if there are no entries, the module returns an error. If there is an entry, SCSI-OSD module 48 reads data from the allocated segments based on the allocated segment numbers retrieved from table 130. Thus, by using the PARTITION_ID and USER_OBJECT_ID, an application from a host can read and write data in object-based format using READ and WRITE commands.

CKD module 49 processes the FICON® protocol and stores data as Count Key Data (CKD) Format to an LDEV. Regarding FICON® protocol, there is a standard documentation as Single Byte Command Code Sets (SBCCS) in the ANSI FC-SB specification. When CKD module is selected by the virtual port selector 51, the port 52 works as an N_PORT and provides Control Unit (CU) and Control Unit Image (CUI) for data access. An N_PORT in FC protocol is a "node" port that connects via a point-to-point link to either a single N_PORT or a single F_PORT (fabric port). N_PORTs handle creation, detection, and flow of message units to and from the connected systems. N_PORTs are end ports in virtual point-to-point links through a fabric, for example N_PORT to F_PORT to F_PORT to N_PORT might be a communication from one node to another passing through a single Fibre Channel fabric switch.

The map for protocol group and LDEV uses a relationship between LDEV and CU:CUI to identify the data store. Regarding the details of the format for CKD using LBA address space, see U.S. Pat. No. 6,499,056, to Kitamura el., referred to above, e.g., at column 3, line 50, through column 4, line 46, and FIG. 2. In the Kitamura et al. patent, CKD data is stored on LBA address space using ESCON® protocol. In the present invention, the connection between the storage subsystem 40 and the host 22 is FICON® instead of ESCON®, however this difference does not impact the method CKD access when using FICON®, because FICON® protocol executes CKD format access in the same manner as the ESCON® protocol. Further, in this invention, logical block address is provided by the LDEV and then the CKD module 49 translates between CKD format and LBA format in the manner taught by U.S. Pat. No. 6,499,056.

LDEV manager 46 manages parity groups and provides the LDEVs 39. LDEV manager 46 includes several parity groups from disks using RAID 0/1/2/3/4/5/6 technology. RAID 6, based on RAID 5 technology, uses dual parity protection. A created parity group is listed in an LDEV configuration table 140 illustrated in FIG. 7. Table 140 includes a column for parity group number 141 to identify the parity group within a storage subsystem, usable capacity size 142 created from RAID technology, RAID configuration 143, and a listing 144 of the physical disks for each RAID group. For each LDEV, LDEV manager 46 provides read/write access for LBAs. The read and write access is by a unit of LBA from start LBA to end LBA, as is described in more detail below.

FC-SCSI module 47 also manages LDEVs 39 which are created from a defined parity group. Each LDEV 39 presents a logical storage area for an LU or a Control Unit Image to store and return data from/to host. The LDEV is a portion of a parity group and an administrator defines and initially formats the region of the LDEV by adding the number of LDEV. The mapping between LDEV and parity group is managed according to LDEV configuration table 140 by controller 45. On a parity group number according to column 141, a record in LDEV configuration table 140 includes LDEV number 145 for identifying the LDEV 39 within the storage subsystem 40, the start LBA 146 to represent the relevant LDEV's start address on the parity group, and the end LBA 147 to represent the particular LDEV's end address on the parity group.

Each of the modules 46-53 of storage subsystem 40 are enabled in microcode which is executed on the controller (CTL) and is provided as a program code installing from or stored on a computer-readable medium, such as memory, optical media, floppy disk, other removal devices via management console 400 or internal service console (not shown).

Behavior of Selector

The present invention provides means to select the protocol for an appropriate LDEV in each protocol group. To select the appropriate LDEV, virtual port selector module 51 and FC-SCSI/SCSI-OSD selector module 50 play an important role. The specifics of the functioning of these modules are discussed below.

Virtual Port Selector

Figure 8:
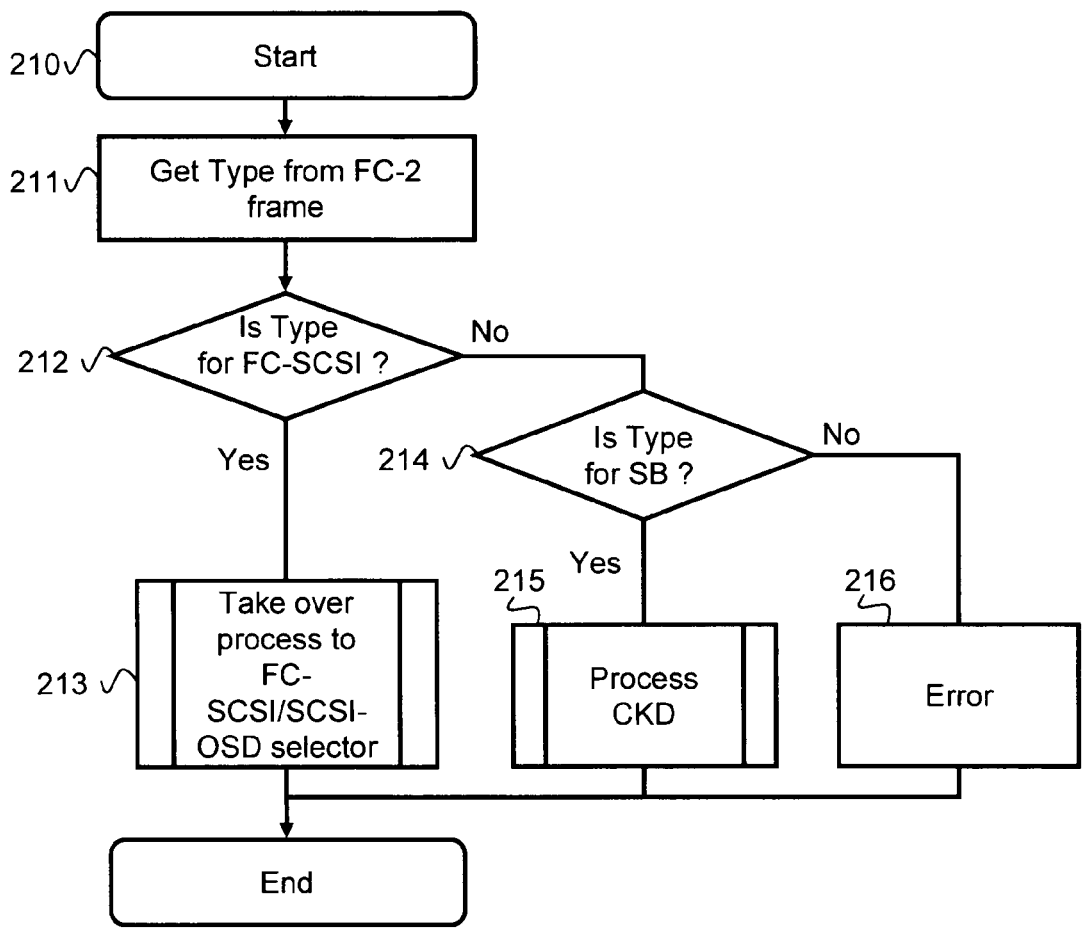
FIG. 8 illustrates a flowchart of an example of an operation of the virtual port selector.

Referring to FIG. 8, the process flow is illustrated whereby virtual port selector module 51 selects the appropriate protocol modules to handle a command by using information from the FC-2 header. The format of a typical FC-2 header 801 is illustrated in FIG. 17 and is based on FC-FS (Frame and Signal) 2 specification. Regarding TYPE field 802, if the entry is "08h", then the format may be presumed to be FC-SCSI or SCSI-OSD, since this indicates that the command is based on FC-SCSI, and should be passed to the FC-SCSI/SCSI-OSD selector 50. However, if the entry in TYPE field 802 is "18h", "1Ch", or "1Bh" then the command is related to SBCCS (Single Byte Command Code Sets) which indicates the command should be processed by the CKD module 49.

When a command is sent to the virtual port selector module 51, the selector module 51 performs the following steps, as illustrated in FIG. 8.

Step 211: Virtual port selector module 51 gets a header of the FC-frame for the command.

Step 212: Virtual port selector module 51 checks the TYPE 802 of the protocol. If the TYPE is "08h", it is determined that the command is a SCSI command, and the procedure passes to step 213 to determine whether the command is FC-SCSI or SCSI-OSD. If the TYPE 802 is other than 08h, it is determined that the command appears to be a CKD command, and the procedure goes to Step 214.

Step 213: Virtual port selector module 51 passes the operation to FC-SCSI/SCSI-OSD selector 50. The FC-SCSI/SCSI-OSD selector 50 executes the CDB operation to determine whether the command is FC-SCSI or SCSI-OSD as described in more detail below with respect to FIG. 9.

Step 214: Virtual port selector module 51 checks the TYPE 802 of protocol of the command. If the type is "18h", "1Ch", or "1Bh" the procedure to process SBCCS and CKD format, the procedure goes to Step 215. If the protocol is other, the procedure goes to Step 216

Step 215: Virtual port selector module 51 passes the operation to CKD module 49. The CKD Module 49 executes the CKD operation.

Step 216: Virtual port selector module 51 returns an error because it is unable to process the requested protocol.

FC-SCSI/SCSI-OSD Selector

Figure 9:
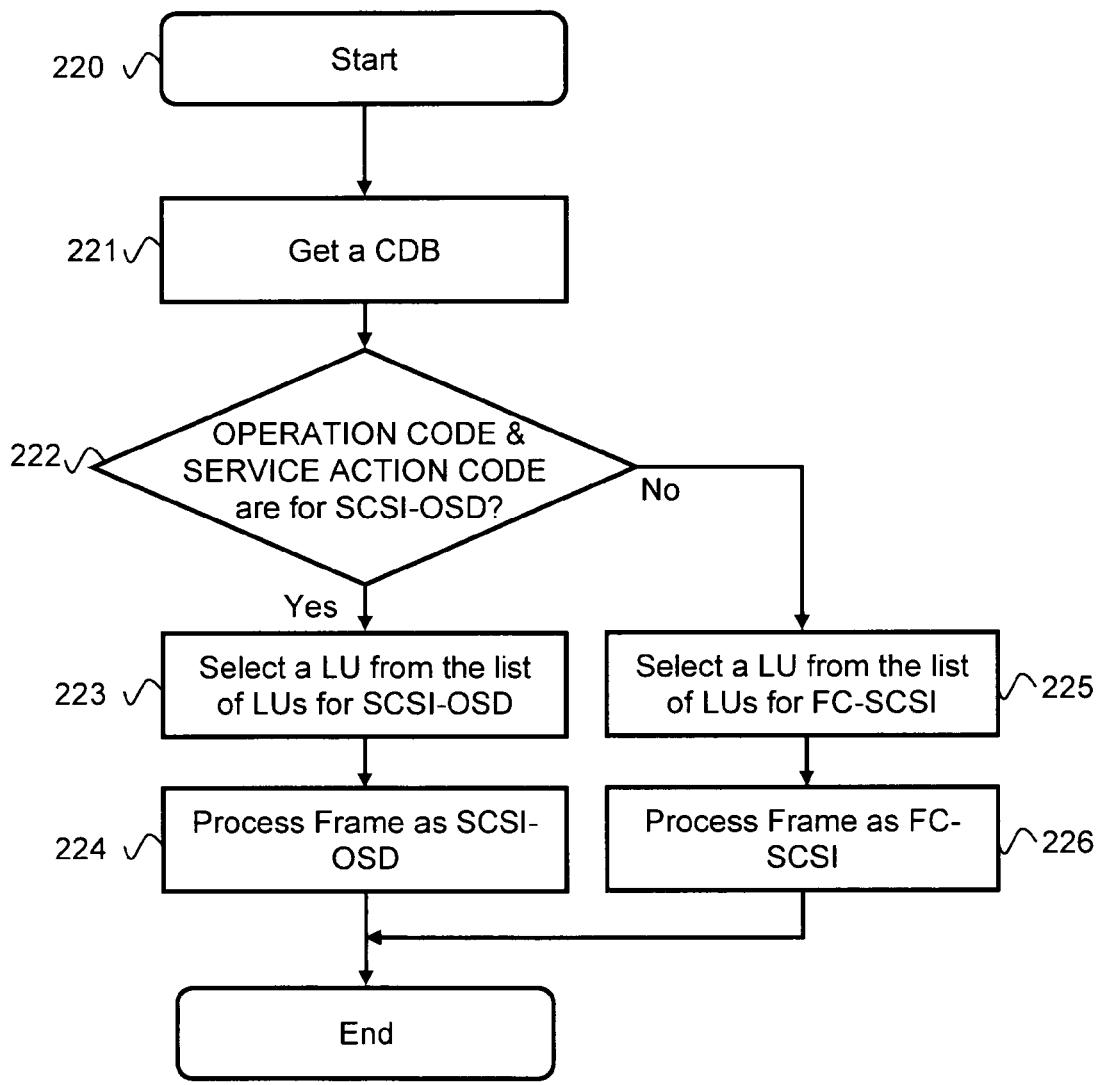
FIG. 9 illustrates a flowchart of an example of an operation of the FC-SCSI/SCSI-OSD selector.
Figure 18:
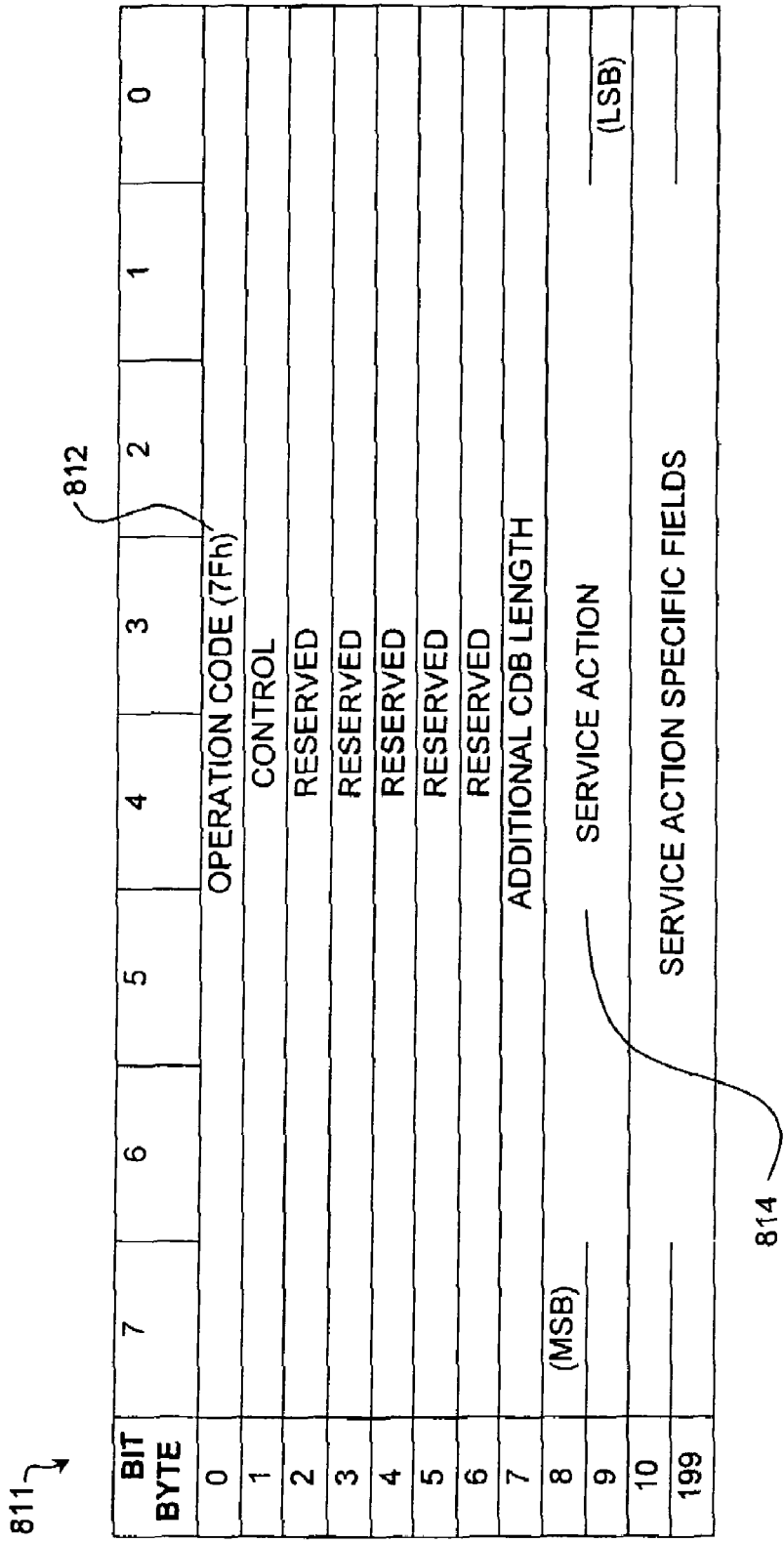
FIG. 18 illustrates a general example of a CDB.

Referring to FIG. 9, there is shown the process flow for the FC-SCSI/SCSI-OSD selector module 50. The FC-SCSI/SCSI-OSD Selector 50 distinguishes whether the CDB is for FC-SCSI (i.e., FBA format) or an object-type format, based in part on the FC-SCSI operation code. Table 811, illustrated in FIG. 18 is a general example of a CDB in accordance with the ANSI OSD specification. According to the ANSI OSD specification, the SCSI-OSD's operation code is defined as "7Fh" in the 0th byte on the standard SCSI-OSD CDB, and service action 814 from the 8th byte to the 9th byte is from 8800h to 8F7Fh. The operation code is a command identifier to process commands for an OSD type device, set according to the ANSI standard specification for OSDs. For the commands defined by this standard, the service action field in the CDB uniquely identifies each command function. Based on these requirements for distinguishing SCSI-OSD commands from FC-SCSI commands, the procedure to select the format of a command is as follows:

Step 220: FC-SCSI/SCSI-OSD selector 50 receives a request to process the CDB.

Step 221: FC-SCSI/SCSI-OSD selector 50 examines the CDB command. If the operation code 812 in the 0th byte is "7Fh" and service action 814 from the 7th byte to the 8th byte is between 8800h to 8F7Fh, the CDB is for SCSI-OSD, and the procedure goes Step 223. If the operation code 812 is other than 7Fh, the procedure goes to Step 225.

Step 223: FC-SCSI/SCSI-OSD selector 50 selects an LU specified by the CDB. When the selector 50 selects an LU, it selects the LU from LU-LDEV mapping table 110 of FIG. 4. The mapping of table 110 includes groups of protocol, LU, and LDEV number. In this step, the selector 50 has determined that the command is a SCSI-OSD type. The selector selects an LU specified by the CDB from an LU in the SCSI-OSD group.

Step 224: FC-SCSI/SCSI-OSD selector 50 passes the CDB process over to the SCSI-OSD module 48 for carrying out the command.

Step 225: FC-SCSI/SCSI-OSD selector 50 has determined that the command is not in SCSI-OSD format, so the selector 50 determines that the command is for FC-SCSI format. Selector 50 selects an LU specified by the CDB using table 110. When the selector selects a LU, it selects the LU from LU-LDEV mapping of table 110 and from the FC-SCSI group. The selector 50 selects an LU specified in the CDB from the FC-SCSI group.

Step 226: FC-SCSI/SCSI-OSD selector 50 passes the CDB over to the FC-SCSI module 47 for carrying out the command.

Behavior of Each Protocol

Using the modules of the invention, including virtual port selector 51 and FC-SCSI/SCSI-OSD selector 50, the storage subsystem 40 can process several protocols for each appropriate LDEV on a port.

Figure 10:
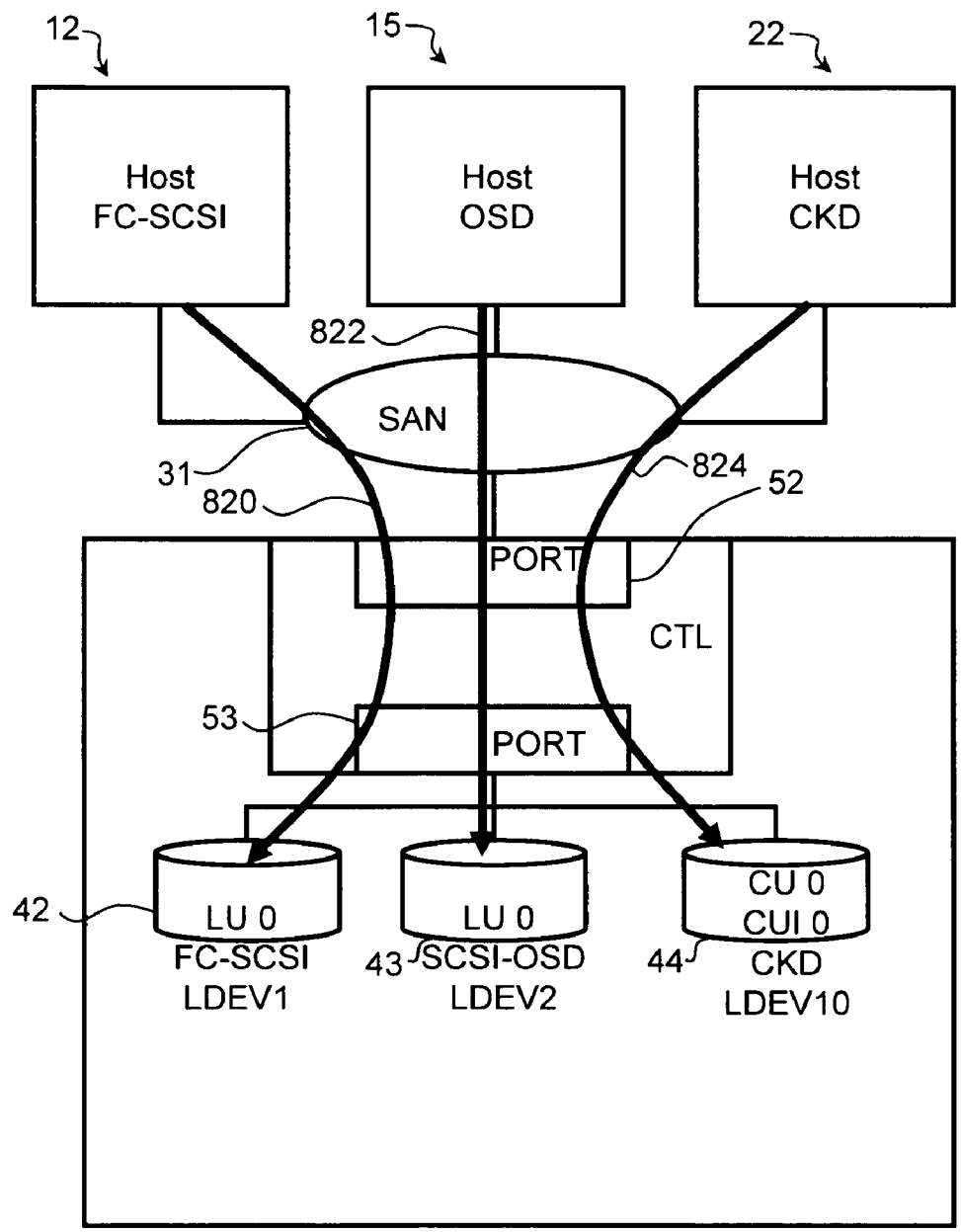
FIG. 10 illustrates an example of shared access to a port by hosts of different protocols.

FIG. 10 shows one example of when a port is shared by the several protocols FC-SCSI, SCSI-OSD, and CKD. In this example, there are three types of hosts which are FC-SCSI initiator host 12, SCSI-OSD initiator host 15, and CKD host 22. Those hosts are able to connect to SAN 31. The storage subsystem also is able to connect to SAN 31 from port 52 and has configured logical devices for each protocol which have been configured by an administrator, or the like. In this configuration, LDEV1 includes LU-0 42 in the FC-SCSI group, LDEV2 includes LU-0 43 in the SCSI-OSD group, and LDEV10 is in the CKD group and includes CU0:CU10 44. The hosts 12, 15, 22 are able to access each accessible LDEV for their particular formats. For instance, FC-SCSI initiator host 12 accesses to LDEV1 (arrow 820), SCSI-OSD initiator host 15 accesses to LDEV2 (arrow 822), and CKD host 22 accesses to LDEV10 (arrow 824).

FIGS. 11A-11C illustrate the details of the procedure for access by hosts for each format type in FIG. 10. For all of the cases, the procedure starts after Port Login (PLOGI) and Process Login (PRLI) in the Fibre Channel protocol. Regarding the FC-SCSI case, as illustrated in FIG. 11A, the procedure is as follows:

Step 901: The host issues an FC-SCSI command with an FC header to virtual port selector 51.

Step 902: Virtual port selector 51 determines whether the command is a SCSI command or a CKD command and, upon determining that the command is a SCSI command, passes the command to FC-SCSI/SCSI-OSD selector 50 to determine whether the command is an FC-SCSI command or a SCSI-OSD command.

Step 903: FC-SCSI/SCSI-OSD selector 50 determines whether the command is an FC-SCSI command or a SCSI-SD command, and upon determining that the command is an FC-SCSI command, forwards the command, such as a READ or WRITE command to FC-SCSI module 47.

Step 904: FC-SCSI module 47 processes the FC-SCSI command. If FC-SCSI module needs to have access to data on an LDEV, i.e., LDEV1, LDEV Manager 46 executes a read or write call for the required blocks on the target LDEV. If the command can be processed with the FC-SCSI module 47, such as in the case of an INQUIRY command, the command is processed and the procedure skips to Step 906

Step 905: LDEV manager module 46 returns the result to FC-SCSI module 47.

Step 906: FC-SCSI module returns the result as CHECK CONDITION to the host. If there is error, the SCSI sense key is included in order to show the detailed information regarding the error.

Step 907: FC-SCSI/SCSI-OSD selector 50 forwards the result by FC-SCSI sense key to virtual port selector 51 or directly to port 52.

Step 908: the result of the FC-SCSI command with an FC header is then forwarded to the host. After the FC-SCSI execution from Step 901 to 908, FC-SCSI initiator host 12 may continue to process other FC-SCSI commands.

Next, referring to FIG. 11B, for the case of processing an SCSI-OSD command the procedure is as follows:

Step 911: Host 15 issues a SCSI-OSD command with an FC Header to virtual port selector 51.

Step 912: Virtual port selector 51 determines whether the command is SCSI or CKD, and upon determining that the command is SCSI, passes the command to FC-SCSI/SCSI-OSD selector 50.

Step 913: FC-SCSI/SCSI-OSD selector 50 determines whether the command is FC-SCSI or SCSI-OSD and, upon determining that the command is SCSI-OSD, forwards the command to SCSI-OSD module 48.

Step 914: SCSI-OSD module 48 processes the command based on SCSI-OSD command sets, such as CREATE, READ and WRITE. In the case of a READ and WRITE, access to data in an LDEV is made using segment information identified by PARTITION_ID and USER_OBJECT_ID as described above with reference to table 130. SCSI-OSD module 48 issues read or write requests to LDEV manager 46 for each required segment. If there are several segments, SCSI-OSD module 48 may issue several FC-SCSI commands for each segment to the LDEV manager 46. If the command does not require data access to an LDEV, and SCSI-OSD module 48 can process the command internally, the procedure skips to Step 916.

Step 915: LDEV manager module returns any requested results to SCSI-OSD module 48.

Step 916: SCSI-OSD module reassembles data for the object based on the returned object data and returns the result to FC-SCSI/SCSI-OSD selector 50. If there is an error of FC-SCSI access for a segment, SCSI-OSD module returns an error which is CONDITION STATUS with error condition.

Step 917: FC-SCSI/SCSI-OSD selector 50 forwards the result by FC-SCSI sense key to the virtual port selector 51 or directly to port 52.

Step 918: The result of the SCSI-OSD command with an FC header is then forwarded to the host 15. After the FC-SCSI execution from Step 911 to 918, SCSI-OSD initiator host 15 may continue to process other SCSI-OSD commands.

As illustrated in FIG. 11C, the case for processing a CKD command is as follows:

Step 921: Host 22 issues a CKD command with an FC header which is "18h", "1Ch" or "1 Bh" as TYPE 802 of frame to virtual port selector 51.

Step 922: Virtual port selector 51 determines that the command is a CKD command and passes the command to the CKD module 49.

Step 923: CKD module 49 processes the CKD command, and as required, calls LDEV manager 46 for read/write functions to access an appropriate LBA in the LDEV10. If CKD module needs several read/write accesses for LDEV10, CKD module may execute several read/write calls to the LDEV10 based on LBA address space.

Step 924: LDEV manager module 46 returns the results to CKD module 49.

Step 925: CKD module returns a result of CDK operation and returns the result to virtual port selector 51 or directly to port 52. If there an error occurs during the read/write calls, CKD module 49 returns an error.

Step 926: The result of the CKD command with FC header is then forwarded to the host.

Second Embodiment

Under the second embodiment, the storage system determines whether to process a command as an FC-SCSI command or a SCSI-OSD command based upon an FCP_LUN entry in an FC Information Unit Frame, which is an organized collection of data specified by the Fibre Channel protocol to be transferred as a single sequence CMMND Payload, instead of checking for information in the CDB, as in the first embodiment.

Thus, the second embodiment differs from the first embodiment in that the numbering of LUNs are provided for each SCSI-OSD LU and FC-SCSI LU. In this example, each LUN receives a distinct number and is specified for a particular type of processing, i.e., either FC-SCSI or SCSI-OSD. The modified version of this mapping table is illustrated as table 110a in FIG. 12. For example, as illustrated in table 110a, column 112, LUN 1 may be created for FC-SCSI storage and LUN 2 may be created for SCSI-OSD storage. To indicate this mapping between LUN and processing of LUN, the number assigned for each LUN must be unique for the storage system. The mapping of the LUNs to format groups may be defined by an administrator using management console 400.

Figure 13:
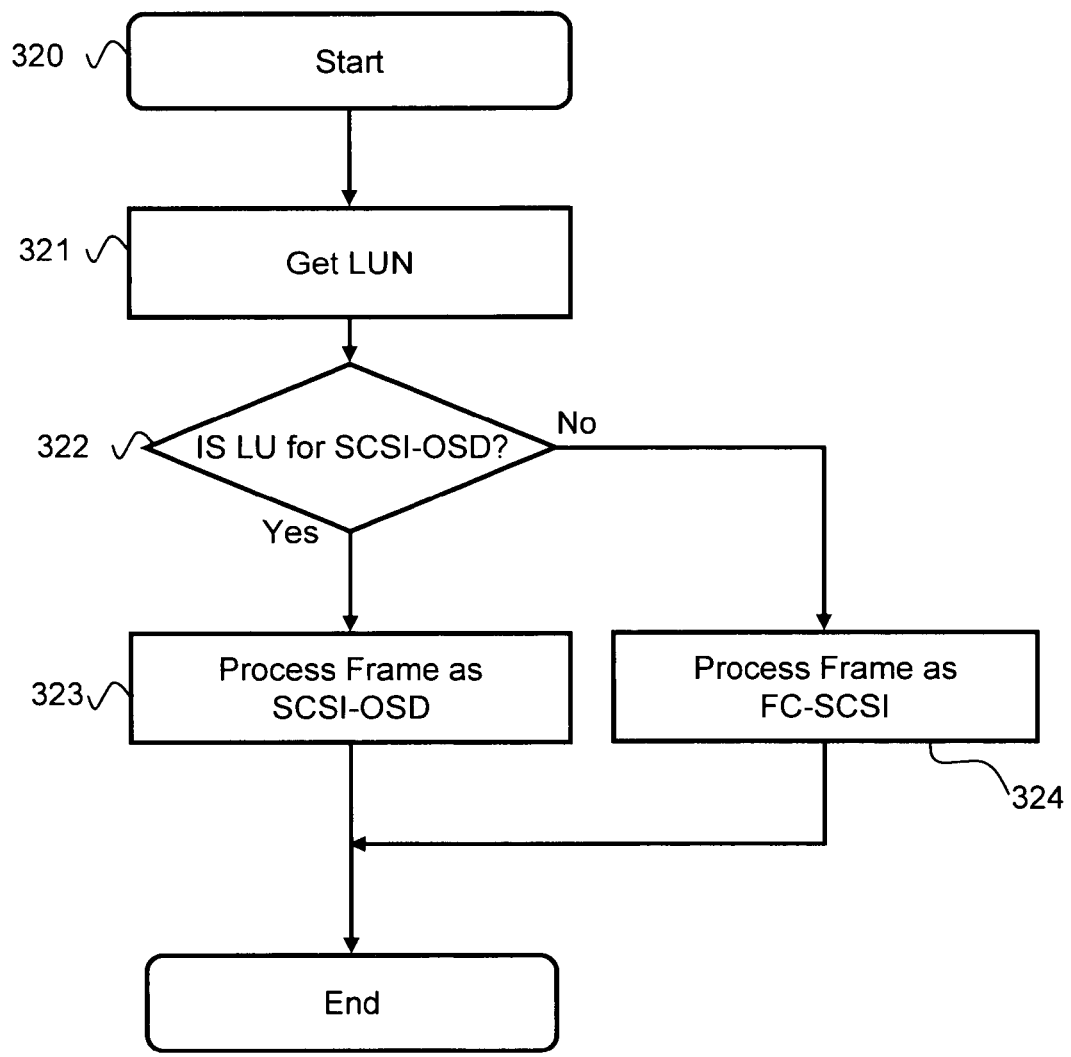
FIG. 13 illustrates a flowchart of an alternative example of an operation of the FC-SCSI/SCSI-OSD selector that is different from the operation of the selector illustrated in FIG. 9.
Figure 19:
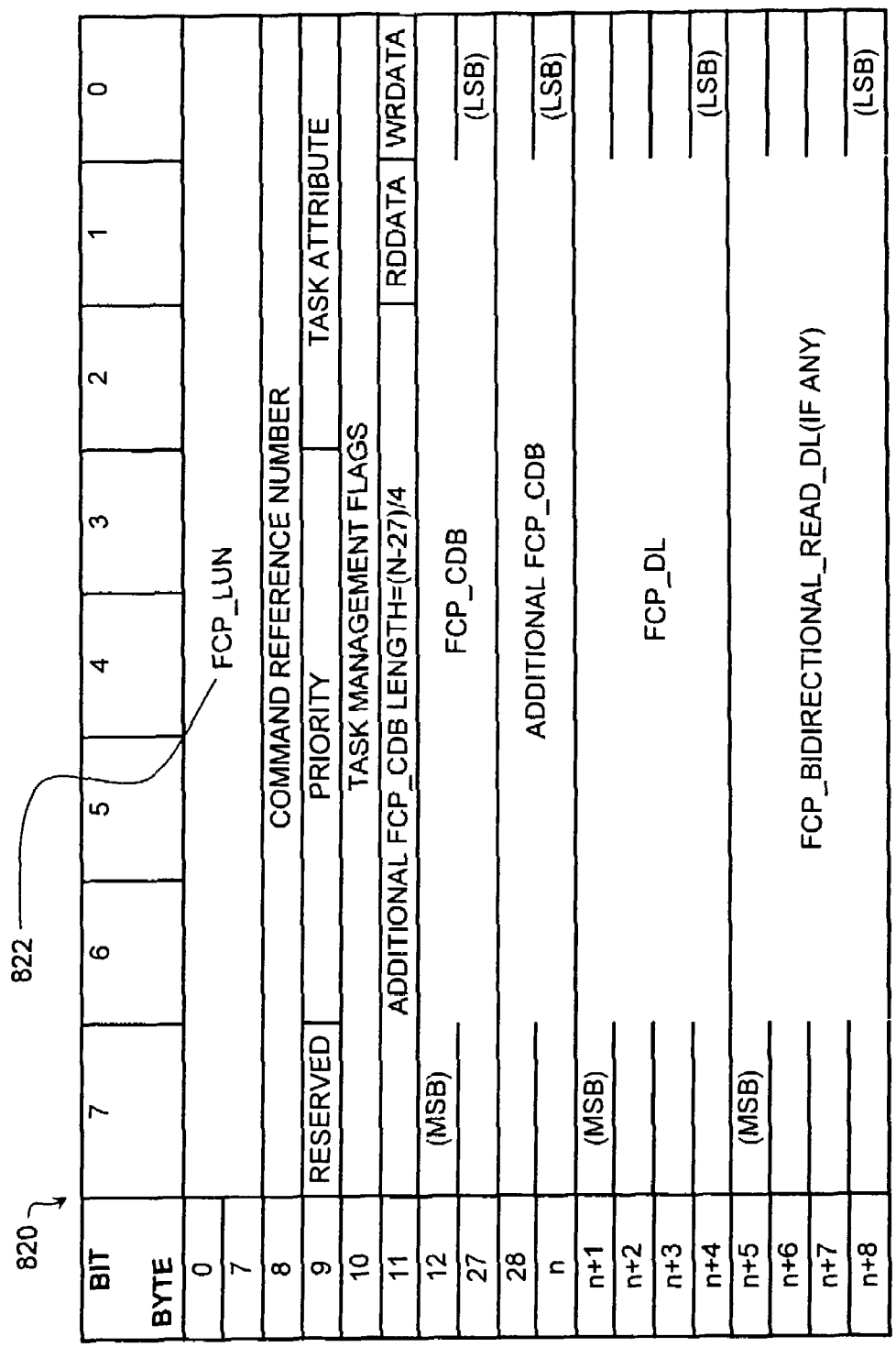
FIG. 19 illustrates a typical example of an FCP Command Information Unit (IU) format.

An additional difference between this embodiment and the embodiment described above is the procedure used for determining whether a command is in FC-SCSI or SCSI-OSD protocol. In the first embodiment described above, SCSI-OSD/FC-SCSI selector 50 checks the information contained in the CDB and selects a LU within a group (see steps 222, 223, 225 in FIG. 9). However in the second embodiment, FC-SCSI/SCSI-OSD selector 50 checks the FCP_LUN specified in the FC Frame, and selects the appropriate protocol for each LUN. FIG. 19 illustrates the format of a typical payload 820 for ANSI's Fibre Channel Protocol for FC-SCSI, Third Version FCP-3. Payload 820 includes from bytes 0-7 the FCP_LUN 822 specified for that command, and this may be used to determine which LUN is specified by the host, and thereby, determine the protocol of the command. The procedure carried out by virtual port selector module 51 remains the same in the second embodiment. Thus, that portion of the procedure set forth in FIG. 8 does not need to be repeated here. Accordingly, the procedure carried out by FC-SCSI/SCSI-OSD selector 50 in the second embodiment is illustrated in FIG. 13, and as set forth below.

Step 320: FC-SCSI/SCSI-OSD selector 50 receives an FC information unit 820, which is an organized collection of data specified by the Fibre Channel protocol to be transferred as a single sequence by a Fibre Channel service interface.

Step 321: SCSI-OSD/FC-SCSI selector 50 analyses FCP_LUN field 822 in the FC information unit 820 to get the targeted LUN number. Selector 50 then accesses table 110a of FIG. 12 to select the specified LUN and to find the matched protocol group from column 111, based upon the LUN specified in column 112 in FIG. 12.

Step 322: SCSI-OSD/FC-SCSI selector checks the found protocol group. If the group is SCSI-OSD the procedure goes to Step 323. If the group is not SCSI-OSD, the procedure goes to Step 324.

Step 323: SCSI-OSD/FC-SCSI selector passes the CDB processing over to SCSI-OSD module 48 for the selected LUN.

Step 324: SCSI-OSD/FC-SCSI selector passes the CDB processing over to FC-SCSI module 47 for the selected LUN. The remainder of the processing is as described above with respect to the first embodiment.

Third Embodiment

The access method in the third embodiment is similar to that described with respect to the second embodiment, except that the OSD device may be accessed not only as an object-based storage device, but also as an FC-SCSI device for the purpose of backup of the OSD device. For backing up an OSD device, it is desirable to copy and store the data using FBA format (i.e., copying blocks of data), since this typically requires much less time than copying and storing each object individually.

Figure 12:
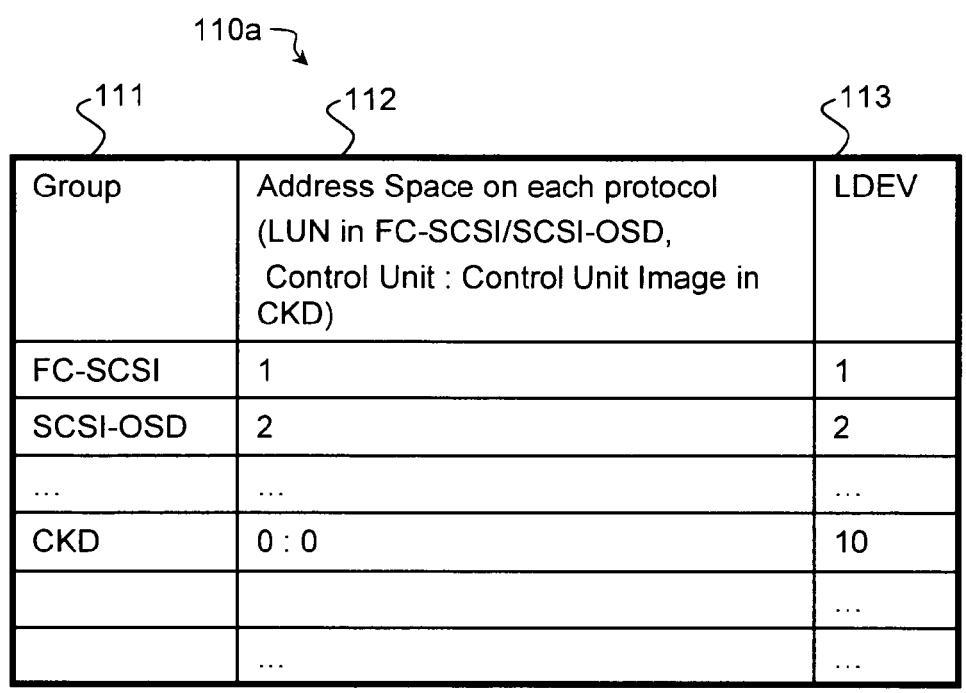
FIG. 12 illustrates a modified version of mapping protocol groups and logical units according to a different embodiment from FIG. 4.
Figure 14:
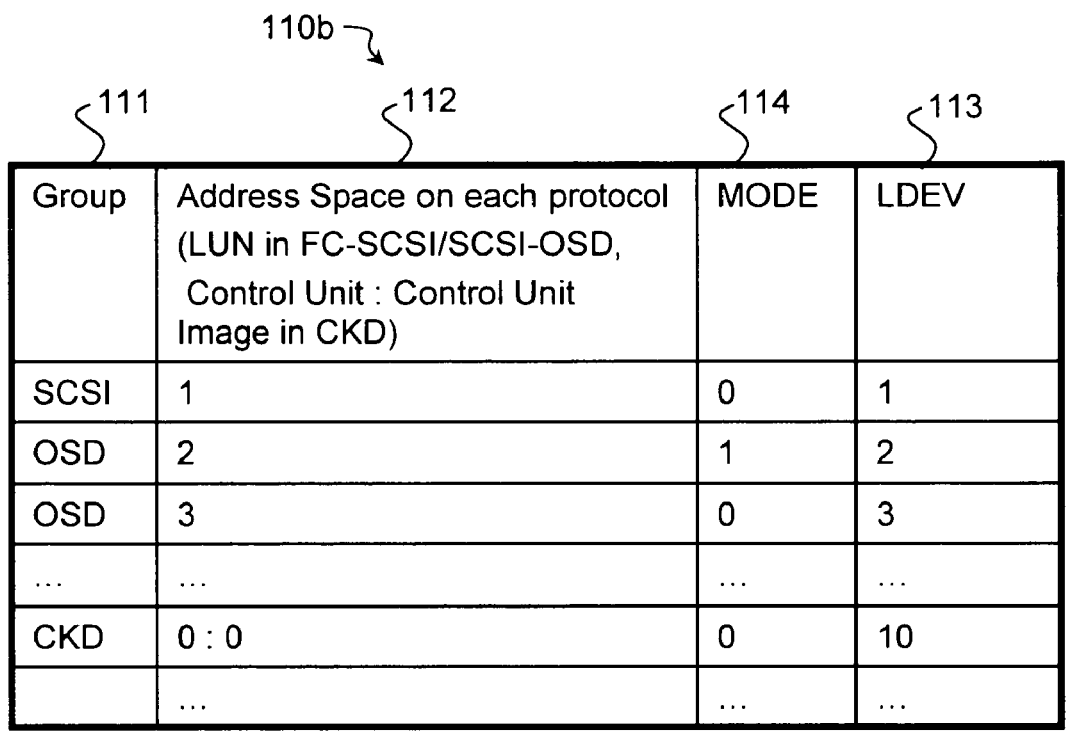
FIG. 14 illustrates a further modified version of mapping protocol groups and logical units according to a different embodiment from that of FIGS. 4 and 12.

In the third embodiment, instead of the mapping table 110a illustrated in FIG. 12 for the second embodiment, storage controller 45 manages a mapping table 110b, as illustrated in FIG. 14. Table 110b includes an entry for MODE 114. When the value of MODE 114 of a corresponding LDEV 113 is 1, the LDEV can be accessed by hosts using FC-SCSI commands. MODE 114 can be set by an administrator via management console 400 when the LDEV is defined as an OSD.

Figure 15:
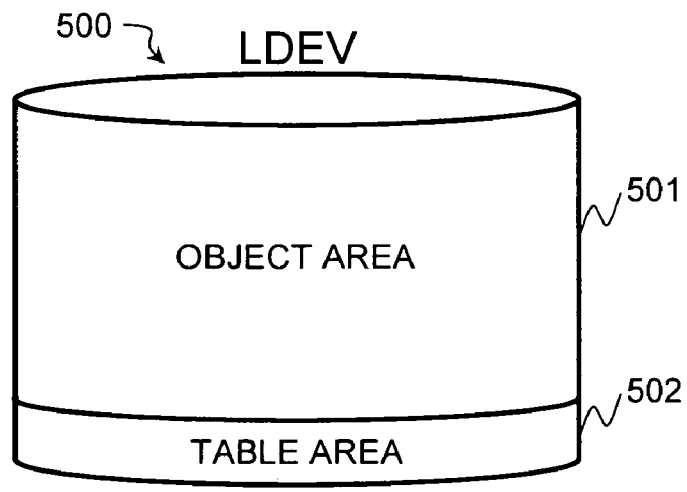
FIG. 15 illustrates an example of an LDEV according to an embodiment of the present invention.

In the third embodiment, the mapping between an object and segment, as described with reference to FIG. 5 in the first embodiment, is stored in each LDEV. FIG. 15 illustrates a configuration of an LDEV 500 that may be used in the third embodiment for an OSD. LDEV 500 includes an object area 501, which may be a region where the objects (in OSD) are stored. LDEV 500 further includes a table area 502 that may be used for storing the mapping table (FIG. 5) and pool table (FIG. 6). When the LDEV is used as an OSD, only object area 501 can be used for storing/reading objects from hosts. However, when the LDEV is accessed as an FC-SCSI device for purposes of backing up the LDEV, the storage controller 45 permits the host to access both object area 501 and table area 502.

Figure 16:
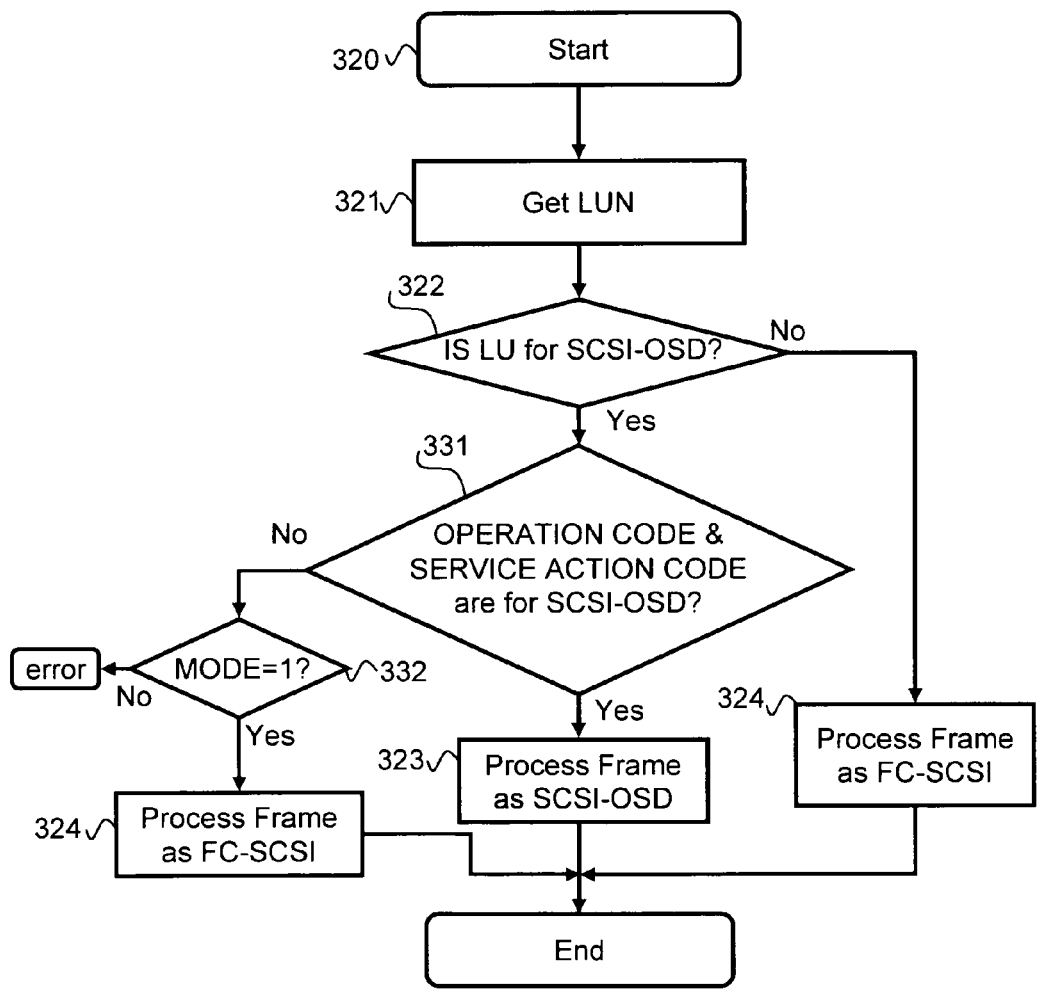
FIG. 16 illustrates a flowchart of yet another alternative example of an operation of the FC-SCSI/SCSI-OSD selector that is different from the operation illustrated in FIGS. 9 and 13.

FIG. 16 illustrates the process flow of FC-SCSI/SCSI-OSD selector 50 for the third embodiment. The process is similar to that set forth in FIG. 13, with respect to the second embodiment, except that steps 331 through 332 are added.

Step 320: FC-SCSI/SCSI-OSD selector 50 receives an FC Information unit 820.

Step 321: FC-SCSI/SCSI-OSD selector 50 analyzes FCP_LUN field 822 in FC information unit 820 to obtain a target LUN number, and selects the LUN to find the matched protocol group 111 from LUN column 112 in table 110b in FIG. 14.

Step 322: FC-SCSI/SCSI-OSD selector 50 checks the found protocol group. If the group is SCSI-OSD, the procedure goes to Step 331. If the group is not SCSI-OSD, the procedure goes to Step 324.

Step 331: FC-SCSI/SCSI-OSD selector analyses the CDB command. If the operation code and service action matches the SCSI-OSD protocol, as described above in the process set forth in step 222 of FIG. 9, the process is an SCSI-OSD command, and the process proceeds to step 323. If not, the command may be a backup command in FC-SCSI format and the process goes to step 332.

Step 332: FC-SCSI/SCSI-OSD selector 50 checks MODE 114 in table 110b of FIG. 14. If MODE 114 is 1, the process goes to step 324 to process the frame as FC-SCSI command. This indicates that the command is a backup command to backup the OSD using FC-SCSI protocol. However, if MODE 114 is not 1, since the LDEV for an OSD should not otherwise be accessed by using FC-SCSI commands, selector 50 returns an error to the host that sent the command.

Step 324: FC-SCSI/SCSI-OSD selector 50 passes the CDB command over to FC-SCSI module 47 for processing with the selected LUN.

Step 323: FC-SCSI/SCSI-OSD selector 50 passes the CDB command to SCSI-OSD module 48 for the processing with the selected LUN.

In the third embodiment, a LDEV 500 that is used as an OSD can be accessed by FC-SCSI initiator hosts 12. This is useful for backing-up data stored in object-based format into a backup device (such as tape) in accordance with FC-SCSI protocol (FBA format). By reading entire regions (including table area 502) in the LDEV 500 and writing them to the backup device, since both the object and the object-segment mapping can be backed up together, backup can be performed more quickly. When restoring data, after a user or host 10 finishes writing back all data into an LDEV used as an OSD, the LDEV can be accessed by using SCSI-OSD protocol.

In the process described above, the OSD whose MODE 114 is 1 can be read or written from FC-SCSI initiator hosts 12. But in another embodiment, the storage controller 45 may work as an initiator device. That is, in an environment where backup devices such as a tape library are connected to SAN 31 (such as via FC switch/hub 30), to backup data in an OSD (whose MODE 114 is 1), the storage controller 45 can copy data in the OSD and write directly to the backup devices. Also, to restore data to an OSD whose MODE 114 is 1, the storage controller 45 can read data from the backup devices and write it back to the OSD, so that the restore operation can be performed without host computer intervention. The initiation of the backup or restore operation can be invoked from the console 400. Or in another embodiment, the backup or restore instruction may be issued from the hosts 10.

While specific embodiments have been illustrated and described in this specification, those of ordinary skill in the art will appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of enabling storage of data using both SCSI-OSD protocol and block access SCSI protocol in a storage system, the method comprising steps of:
receiving a command including a command descriptor block (CDB) from a host;
determining whether the CDB contains a SCSI-OSD operation code and a SCSI-OSD service action code;
when the CDB contains both the SCSI-OSD operation code and the SCSI-OSD service action code, a logical unit is selected from a list of logical units prepared for storage of data using the SCSI-OSD protocol; and
when the CDB does not contain both the SCSI-OSD operation code and the SCSI-OSD service action code, a logical unit is selected from a list of logical units prepared for storage of data using the block access SCSI protocol.

2. The method according to claim 1, further including a step of:
determining from a type field of a header of the command whether the command uses a SCSI-based protocol or a count-key-data (CKD) protocol prior to determining whether the 0DB contains the SCSI-OSD operation code and the SCSI-OSD service action code.

3. The method according to claim 2, further including a step of:
providing a block access SCSI module and a SCSI-OSD module, said block access SCSI module processing and responding to the command if the CDB does not contain both the SCSI-OSD operation code and the SCSI-OSD service action code, and said SCSI-OSD module processing and responding to the command if the CDB contains both the SCSI-OSD operation code and the SCSI-OSD service action code.

4. The method according to claim 3, further including a step of:
providing a logical device manager for accessing logical devices on selected logical units, as required to carry out the command.

5. The method according to claim 1, further including steps of:
determining from a type field of a header of the command whether the command uses a SCSI-based protocol prior to the step of determining whether the CDB contains the SCSI-OSD operation code and the SCSI-OSD service action code; and
when a determination is made that the type field of the header does not contain code for a SCSI protocol command, determining whether the type field of the header contains a code for a CKD command.

6. The method according to claim 1, further including a step of:
providing a block access SCSI module and a SCSI-OSD module, said block access SCSI module processing and responding to the command if the CDB does not contain both the SCSI-OSD operation code and the SCSI-OSD service action code, and said SCSI-OSD module processing and responding to the command if the CDB contains both the SCSI-OSD operation code and the SCSI-OSD service action code.

7. The method according to claim 6, further including a step of:
providing a logical device manager for accessing logical devices on selected logical units as required to carry out the command.

8. A method of accessing a storage system having one or more first logical units (LUs) for storing data according to a block access SCSI protocol and one or more second LUs for storing data according to a SCSI-OSD protocol, the method comprising steps of:
receiving a LU number (LUN) in a command header from a host;
determining from stored information whether the LUN belongs to a SCSI-OSD protocol group or a block access SCSI protocol group;
when the LUN belongs to the SCSI-OSD protocol group, processing the command as a SCSI-OSD command; and
when the LUN belongs to the block access SCSI protocol group, processing the command as a block access SCSI command.

9. The method according to claim 8, wherein the step of determining from stored information whether the LUN belongs to the SCSI-OSD protocol group or the block access SCSI protocol group includes a step of reviewing a table stored in a memory that contains mapping information regarding the protocol groups and the LUNs.

10. The method according to claim 8, further including a step of:
determining from a type field of a header of the command whether the command uses a SCSI-based protocol or a count-key-data (CKD) protocol prior to determining whether the LUN belongs to the SCSI-OSD protocol group or the block access SCSI protocol group.

11. The method according to claim 10, further including a step of:
providing a block access SCSI module and a SCSI-OSD module, said block access SCSI module processing and responding to the command if the LUN belongs to the block access SCSI group; and said SCSI-OSD module processing and responding to the command if the LUN belongs to the SCSI-OSD group.

12. The method according to claim 8, further including a step of:
providing a block access SCSI module and SCSI-OSD module, said block access SCSI module processing and responding to the command if the LUN belongs to the block access SCSI group, and said SCSI-OSD module processing and responding to the command if the LUN belongs to the SCSI-OSD group.

13. The method according to claim 12, further including a step of:
providing a logical device manager for accessing logical devices on selected logical units.

14. A method of accessing a storage system having one or more first logical units (LUs) for storing data according to a SCSI protocol for block access and one or more second LUs for storing data according to an SCSI-OSD protocol, the method comprising the steps of:
receiving a LU number (LUN) in a command from a host;
determining whether the LUN belongs to a SCSI-OSD protocol group made up of said one or more second LUs or a SCSI protocol for block access group made up of said one or more first LUs by referring to stored information in the storage system listing LUNs of said first LUs prepared for SCSI protocol for block access and said second LUs prepared for SCSI-OSD protocol;

when the stored information indicates that the LUN belongs to the SCSI protocol for block access group, a corresponding LU is selected from said SCSI protocol for block access group for use in processing the command;

when the stored information indicates that the LUN belongs to the SCSI-OSD protocol group, performing steps of:

obtaining a command descriptor block (CDB) in the command from the host and determining whether the CDB contains a SCSI-OSD operation code and a SCSI-OSD service action code; and when the CDB contains both the operation code and service action code, a corresponding LU is selected from said SCSI-OSD protocol group for use in processing the command.

15. The method according to claim 14, further comprising a step of:

when the CDB does not contain both the operation code and service action code, a mode setting for an LU specified by the LUN is checked to determine whether the specified LU has been authorized to be accessed by a block access SCSI command.

16. The method according to claim 15, further including a step of:

backing up data from the specified LU, wherein the LU is formatted for the SCSI-OSD protocol and the command is a command using the SCSI protocol for block access.

17. The method according to claim 15, further including a step of:

when the mode setting indicates that the selected LU has not been authorized to be accessed by SCSI for block access command, an error message is returned to the host.

18. The method according to claim 17, further including a step of:

determining from a type field of a header of the command whether the command uses a SCSI-based protocol or a count-key-data (CKD) protocol prior to determining whether the LUN belongs to the SCSI-OSD protocol group or the SCSI protocol for block access group.

19. The method according to claim 14, further including the step of:

determining from a type field of a header of the command whether the command uses a SCSI-based protocol or a count-key-data (CKD) protocol prior to determining whether the LUN belongs to the SCSI-OSD protocol group or the SCSI protocol for block access group.

* * * * *